(12) United States Patent
Burlak et al.

(10) Patent No.: US 8,134,339 B2
(45) Date of Patent: Mar. 13, 2012

(54) INTEGRATED CIRCUIT AND METHOD FOR PRESERVING VEHICLE'S BATTERY CHARGE AND PROTECTING TRAILER LOAD

(75) Inventors: Gary Joseph Burlak, Lake Orion, MI (US); Marian Mirowski, West Bloomfield, MI (US)

(73) Assignee: STMicroelectronics, Inc., Carrollton, TX (US)

( * ) Notice: Subject to any disclaimer, the term of this patent is extended or adjusted under 35 U.S.C. 154(b) by 524 days.

(21) Appl. No.: 12/039,015

(22) Filed: Feb. 28, 2008

(65) Prior Publication Data
US 2008/0203975 A1    Aug. 28, 2008

Related U.S. Application Data

(60) Provisional application No. 60/978,019, filed on Oct. 5, 2007, provisional application No. 60/920,465, filed on Mar. 27, 2007, provisional application No. 60/904,407, filed on Feb. 28, 2007.

(51) Int. Cl.
*H02J 7/00* (2006.01)
*H02J 7/04* (2006.01)
*B60L 1/00* (2006.01)
*H02H 7/18* (2006.01)

(52) U.S. Cl. ........ 320/134; 320/104; 320/148; 320/161; 320/165; 307/9.1; 307/10.1; 307/10.7

(58) Field of Classification Search .................. 320/134, 320/161, 136, 104, 137, 127, 128, 132, 135, 320/148, 149, 160, 163, 164, 165; 307/10.7, 307/9.1, 10.1, 10.3, 10.6, 10.8
See application file for complete search history.

(56) References Cited

U.S. PATENT DOCUMENTS

| 4,500,775 A | 2/1985 | Sangu et al. |
| 5,030,938 A | 7/1991 | Bondzeit |
| 5,157,376 A | 10/1992 | Dietz et al. |

(Continued)

FOREIGN PATENT DOCUMENTS
DE    3936638 C1    3/1991

OTHER PUBLICATIONS

Nhtsa; "Development, Evaluation, and Demonstration of a Tractor Trailer Intelligent Communication and Power Link—Truck Multiplexing Enclosure Final Report"; DOT HS 808685; Jan. 1998; pp. 1-24.

(Continued)

*Primary Examiner* — Melissa Koval
*Assistant Examiner* — Alexis Boateng
(74) *Attorney, Agent, or Firm* — Gardere Wynne & Sewell LLP

(57) ABSTRACT

A method and integrated circuit for preserving a battery's charge and protecting electrical devices is disclosed. A maximum and a minimum battery voltage value at the output port are stored in a memory. A steady state battery voltage at the output port is measured and stored in the memory. A processor compares the measured steady state battery voltage value to the maximum and the minimum battery voltage values. If the measured steady state battery voltage value is greater than the maximum battery voltage value, an over voltage state is reported by the processor. If the measured steady state battery voltage value is less than the minimum battery voltage value, a low battery voltage state is reported by the processor.

40 Claims, 6 Drawing Sheets

U.S. PATENT DOCUMENTS

| | | | |
|---|---|---|---|
| 5,397,924 A | 3/1995 | Gee et al. | |
| 5,611,695 A | 3/1997 | Bentley | |
| 5,775,712 A | 7/1998 | Link et al. | |
| 5,854,517 A | 12/1998 | Hines | |
| 5,895,989 A | 4/1999 | Imaizumi et al. | |
| 5,920,128 A | 7/1999 | Hines | |
| 5,945,743 A | 8/1999 | Pattantyus et al. | |
| 5,959,365 A | 9/1999 | Mantini et al. | |
| 5,994,790 A | 11/1999 | Nagashima et al. | |
| 6,039,410 A | 3/2000 | Robertson et al. | |
| 6,115,831 A | 9/2000 | Hanf et al. | |
| 6,130,487 A | 10/2000 | Bertalan et al. | |
| 6,259,170 B1 | 7/2001 | Limoge et al. | |
| 6,369,460 B1 * | 4/2002 | Endoh et al. | 307/31 |
| 6,498,403 B1 | 12/2002 | Hagidaira et al. | |
| 6,545,600 B1 | 4/2003 | Boner | |
| 6,630,747 B1 * | 10/2003 | Kamada et al. | 307/10.1 |
| 6,630,749 B1 * | 10/2003 | Takagi et al. | 307/10.7 |
| 6,642,628 B2 * | 11/2003 | Burdick et al. | 307/9.1 |
| 6,700,386 B2 | 3/2004 | Egami | |
| 6,804,098 B2 * | 10/2004 | Pannwitz | 361/90 |
| 7,053,588 B2 * | 5/2006 | Nakanishi et al. | 320/104 |
| 7,173,347 B2 | 2/2007 | Tani et al. | |
| 7,363,127 B2 | 4/2008 | Fogelstrom | |
| 7,429,806 B2 | 9/2008 | Bainbridge et al. | |
| 7,557,540 B2 | 7/2009 | Kao et al. | |
| 7,567,057 B2 * | 7/2009 | Elder et al. | 320/104 |
| 7,598,708 B2 * | 10/2009 | Kimura et al. | 320/132 |
| 7,671,571 B2 | 3/2010 | Burlak et al. | |
| 7,675,266 B2 * | 3/2010 | Nakano et al. | 320/132 |
| 2001/0040455 A1 | 11/2001 | Arlt et al. | |
| 2002/0030403 A1 | 3/2002 | Lesesky et al. | |
| 2003/0179033 A1 | 9/2003 | Bienvenu et al. | |
| 2003/0195668 A1 | 10/2003 | Radtke et al. | |
| 2003/0200017 A1 | 10/2003 | Capps et al. | |
| 2004/0119517 A1 | 6/2004 | Pauletti et al. | |
| 2004/0189092 A1 | 9/2004 | Burlak et al. | |
| 2004/0199344 A1 * | 10/2004 | Oh | 702/64 |
| 2005/0253456 A1 * | 11/2005 | Spilker | 307/10.1 |
| 2006/0125447 A1 * | 6/2006 | Sugimoto | 320/132 |
| 2007/0006051 A1 | 1/2007 | Burlak et al. | |
| 2007/0013361 A1 | 1/2007 | Burlak et al. | |
| 2007/0252439 A1 | 11/2007 | Menas et al. | |
| 2008/0203975 A1 | 8/2008 | Burlak et al. | |
| 2009/0015193 A1 * | 1/2009 | Esaka et al. | 320/103 |
| 2010/0295514 A1 | 11/2010 | Burlak et al. | |
| 2010/0297883 A1 | 11/2010 | Burlak et al. | |

OTHER PUBLICATIONS

James B. Brown; "4$^{TH}$ International CAN Conference—Using DeviceNet in the Trailer Industry"; 1997; pp. 1-9.

* cited by examiner

INTEGRATED CIRCUIT AND METHOD FOR PRESERVING VEHICLE'S BATTERY CHARGE AND PROTECTING TRAILER LOAD

CROSS-REFERENCE TO RELATED APPLICATIONS

Pursuant to 35 U.S.C. §119 (e), this application claims priority from, and hereby incorporates by reference for all purposes, U.S. Provisional Patent Application Ser. No. 60/978,019, entitled Smart Trailer Tow Connector, and filed Oct. 5, 2007, and U.S. Provisional Patent Application Ser. No. 60/920,465, entitled Enhanced Dynamic Trailer Detection, Exterior Lighting Classification and Short Circuit Protection Method, Improvement and Enhancement, and filed Mar. 27, 2007, and U.S. Provisional Patent Application Ser. No. 60/904,407, entitled Enhanced Dynamic Trailer Detection, Exterior Lighting Classification and Short Circuit Protection Method, and filed Feb. 28, 2007.

FIELD OF THE INVENTION

The invention relates to electronic circuits, and more particularly the invention relates to an integrated circuit and method for preserving a vehicle's battery charge and for protecting electrical loads in a trailer attached to a tow vehicle.

BACKGROUND

In vehicles, aircraft, telecommunications and other systems, batteries are often used to supply dc power to electrical devices (also referred to as electrical loads). The battery must be monitored to detect over voltage and low voltage conditions. An over voltage condition may be caused by electrical transients such as an electrostatic discharge, a charging system load dump, electrical noise, electromagnetic disturbances or a vehicle jump start may damage attached electrical loads. A low voltage condition may be caused, for example, by a fault in an electrical load drawing excessive amount of current, thereby reducing the battery's voltage. If a low voltage condition is detected, load shedding may be initiated by selective removal of one or more electrical loads to prevent the battery from being completely discharged. If an over voltage condition is detected, the battery voltage may be reduced to protect the electrical loads or the load may be temporarily disconnected from the vehicle battery.

In vehicles designed to tow trailers, a trailer tow connector and the electrical components installed in the vehicle to control trailer loads, are typically used to deliver electrical power to the trailer and may also monitor and control various devices or loads installed in the trailer. In production trailer tow designs, the electrical switching devices and circuit protection devices may be installed in several locations in the vehicle and are wired to the passive trailer tow connecter. The trailer tow connector generally includes one or more output ports or pins adapted to deliver electrical power to the trailer devices or loads. The devices may include running lights, brake lights, parking lights, electric brakes, trailer battery and turn signals. Selected output ports or pins in the trailer tow connector are usually connected to a device that serves a particular purpose. For example, there may be an output port for operating the brake lights on the trailer and another output port for operating the right-hand turn signal and yet another for operating the left-hand turn signal.

Typically, a dedicated switched battery output pin on the trailer tow connector is used to power trailer loads which may include a trailer mounted battery or may directly power trailer mounted accessories. These trailer mounted accessories typically include the furnace/heater/refrigerator igniter circuits, the water system, a DC-AC inverter or trailer interior lighting. These trailer loads may be used while the trailer is being towed or when the tow vehicle is stationary, such as at a rest area or parked overnight. Additionally, the charging of the trailer battery is not controlled in production trailer tow electrical designs and a full charge current is constantly applied that can overheat and damage the trailer battery.

Existing trailer tow connectors with their supporting electronic switching and fixed protection devices typically lack the capability to intelligently perform real time measurements of the battery voltage to detect over voltage and low battery voltage conditions. Consequently, existing trailer tow connectors lack the capability to intelligently initiate load shedding to prevent complete depletion of the battery charge and also to reduce the output voltage, current or power delivered to prevent damage to the load. Furthermore, mechanical trailer tow connectors in use today include circuits that are powered by a vehicle battery (or other switched voltage applied) whenever the vehicle is running (switched battery output), or when the tow vehicle's headlamps, brakes, or turn signal outputs are active. These circuits remain powered even if a trailer is not connected to the tow vehicle, which may in trailer tow connector reliability problems due to the voltage in the connector and its exposure to environmental extremes. Due to the voltage in the trailer tow connector, output pin corrosion and dendrite growth are frequent and can lead to undetected trailer electrical malfunctions.

SUMMARY OF THE EMBODIMENTS

A method and integrated circuit for preserving a vehicle's battery charge and protecting electrical devices is disclosed. The electrical devices each receive power from an output port of a respective power control circuit coupled to the battery. The method includes determining a maximum and a minimum battery voltage value at the output port and storing the maximum and minimum battery voltage values in a memory. The maximum and minimum battery voltage values are based on the hardware characteristic of the electrical device and the battery-type.

The method includes measuring a steady state battery voltage at the output port and storing the measured steady state battery voltage value in the memory. The method includes comparing, by a processor, the measured steady battery voltage value to the maximum and the minimum battery voltage values. If the measured steady state battery voltage value is greater than the maximum battery voltage value, an over voltage state is reported by the processor. If the measured steady state battery voltage value is less than the minimum battery voltage value, a low battery voltage state is reported by the processor.

The method includes determining if the loads are attached to the output ports, and if no loads are detected then removing power from the output ports to reduce corrosion and dendrite growth on exposed connector terminals. The method includes detecting if an auxiliary battery is attached and based on monitoring the discharge rate of the auxiliary battery, implementing a multi-stepped PWM current recharge method to prolong the life of the auxiliary battery.

BRIEF DESCRIPTION OF THE DRAWINGS

For a more complete understanding of the features, example embodiments and possible advantages of the present invention, reference is now made to the detailed description of the invention along with the accompanying figures and in which.

DETAILED DESCRIPTION OF THE INVENTION

This application incorporates by reference for all purposes, U.S. patent application Ser. No. 10/967,389 (Publication No. 2006/0085099 A1) entitled Method and System for Driving a Vehicle Trailer Tow Connector, and filed Oct. 18, 2004. This application also incorporates by reference for all purposes United States Applicant for U.S. patent application Ser. No. 12/038,936 entitled ("INTEGRATED CIRCUIT AND METHOD FOR MONITORING AND CONTROLLING POWER AND FOR DETECTING OPEN LOAD STATE") and U.S. patent application Ser. No. 12/039,065 entitled ("INTEGRATED CIRCUIT AND METHOD FOR CLASSIFICATION OF ELECTRICAL DEVICES AND SHORT CIRCUIT PROTECTION") both filed on Feb. 28, 2008.

Figure 1A:
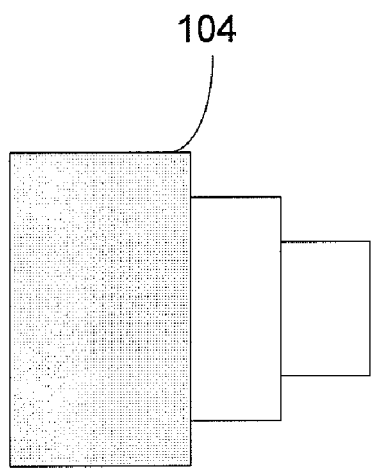
FIG. 1A is a simplified diagram of a trailer tow connector.
Figure 1B:
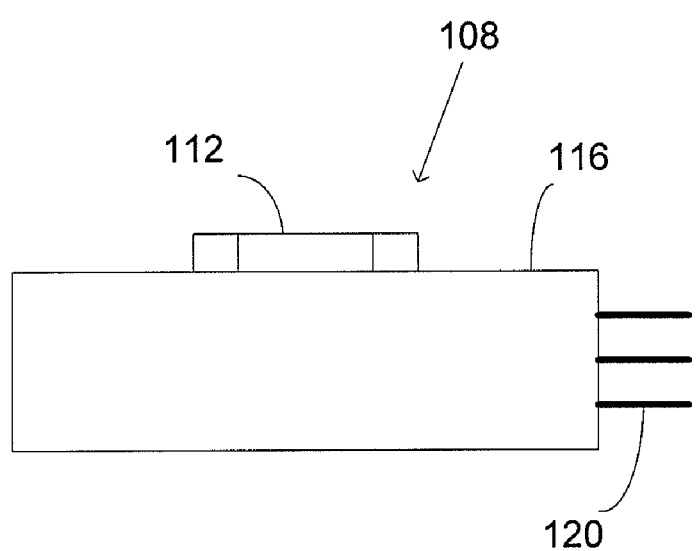
FIG. 1B is a block diagram of an electronic circuit installed inside the trailer tow connector.

FIG. 1A shows a trailer tow connector 104 that may be installed in a vehicle designed to tow a trailer. The trailer tow connector 104 includes an electronic circuit 108 shown in FIG. 1B. Although the electronic circuit 108 is shown separately, it will be understood that the electronic circuit 108 typically resides inside (for example, encapsulated or housed within) the trailer tow connector 104. The electronic circuit 108 includes one or more electronic devices 112 operable to deliver power to the devices in the trailer. The electronic circuit 108 may be installed on a PC board 116, which is securely installed and may be environmentally sealed inside the trailer tow connector 104. The electronic circuit 108 includes one or more output ports or pins 120 that are each connected to a particular device in the trailer.

Figure 2:
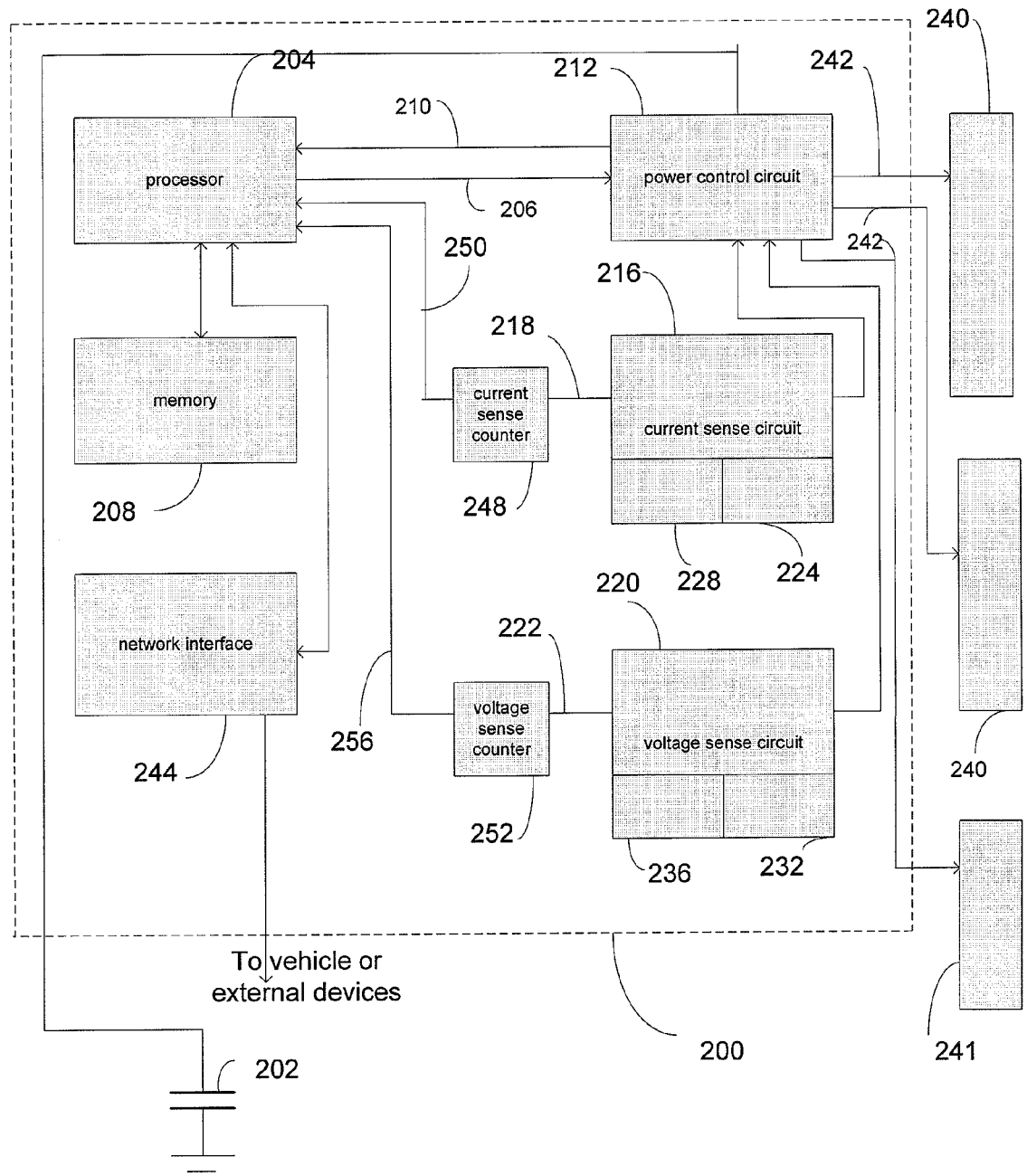
FIG. 2 is an example embodiment of a circuit for preserving a vehicle's battery charge and protecting electrical loads in a trailer attached to the vehicle.

FIG. 2 illustrates an example implementation of a circuit 200 for preserving a vehicle's battery charge and protecting electrical loads in a trailer attached to the vehicle. The circuit 200 may be implemented as an integrated circuit device fabricated on a semiconductor substrate. Alternatively, the circuit 200 may be implemented with discrete, stand-alone components. The circuit is powered from a power supply which may comprise, for example, the battery 202 of a vehicle within which the circuit 200 and connector 104 is installed.

The circuit controls and regulates electrical power from a battery 202 to one or more loads 240 and/or a trailer/auxiliary battery 241. The battery 202 may be a vehicle battery while the trailer battery 241 may be installed in a trailer to power one or more devices in the trailer. The load may be a resistive, inductive, capacitive, a battery or any other type of load installed in a trailer that is towed by a vehicle. For example, the load may be a trailer lighting load (LED, incandescent, Xenon, etc.) or a trailer battery, e.g., a load type. If the attached load type has been classified or is known, an appropriate load control strategy may be implemented. For example, an incandescent load may be protected by a closed loop PWM voltage control, while an LED load may be protected by a closed loop PWM current control. It will be apparent to those skilled in the art that the circuit 200 may be utilized in aircraft power systems, telecommunications, networking, wireless and other applications.

As will be subsequently explained in more detail, the circuit 200 is configured to intelligently monitor a vehicle's battery (i.e., battery 202) to detect over voltage and low voltage conditions. Throughout this document, the vehicle battery voltage may refer to the actual vehicle battery voltage if the engine is not running or may refer to the vehicle charging voltage (battery/alternator) if the engine is running. If an over voltage condition is detected, the circuit 200 intelligently reduces or removes voltage supplied from the battery 202 to protect electrical loads. If a low voltage condition is detected, the circuit 200 intelligently initiates load shedding to prevent the battery 202 from being completely discharged.

The circuit 200 includes a processor 204 coupled to a memory 208. The processor 204 may be one of several commercially available microcontrollers programmed to execute data processing tasks. In particular, the processor 204 is configured to receive data from, and store data in, the memory 208. The processor 204 performs a plurality of mathematical and/or logical operations on data received from both the memory 208 and from other components of the circuit 200 by executing a plurality of instruction codes.

The circuit 200 includes a switched power control circuit 212 electrically coupled to the processor 200. The switched power control circuit 212 controls the power delivered to one or more load(s) 240 in response to a power control signal 206 from the processor 204. The load(s) 240 may be electrically coupled to the switched power control circuit 212 via an associated output port 242. The switched power control circuit 212 may optionally provide a feedback signal 210 to the processor 204. The feedback signal 210 may include power control circuit status including open, short, mode or other device fault details, or may provide other operational information such as device configuration, programming or manufacturing data. In one example implementation, the switched power control circuit 204 is a power semiconductor device such as a power MOSFET or a power integrated base transistor capable of delivering controlled power to the load 240. In response to the power control signal 206 from the processor 204, the duty cycle of the power control circuit 212 is varied to regulate the amount of power delivered to the load 240. In one example implementation, the power control signal 206 is a pulse width modulated signal with a varied duty cycle to control the ON and OFF times of the switched power control circuit 212.

The circuit 200 includes a current sense circuit 216 configured to measure the current flowing in the power control circuit 212 and being delivered to each of the loads 240. The current sense circuit 216 may be incorporated into the switched power control circuit 212. Alternatively, the current sense circuit 216 may be a separate, stand-alone circuit configured to measure the current flowing to the load(s) 240. The current sense circuit 216 measures the current flowing to a given load 240 and provides a current sense signal 218 in response to the measured current. As will be subsequently discussed, if the measured current is less than a predetermined current value, the current sense signal 218 may indicate an open circuit state. The predetermined current value may be a minimum current threshold based on the hardware design characteristics of the load 240 and/or the output port 242 of the circuit 200. If the measured current is more than a maximum current threshold, the current sense signal 218 may indicate a short circuit condition, prompting the processor 204 to remove power from the load 240.

In one example implementation, the current sense circuit 216 includes a reference current generator 224 that generates a reference current. The current sense circuit 216 also includes a comparator circuit 228 that compares the measured current flowing to the load 240 to the reference current, and responsive to the comparison generates the current sense signal 218. The reference current may be the minimum current threshold or any other selected current value. The current sense signal 218 may indicate the operating condition at the output port 242 including any possible malfunction as well as indicate the operating condition of the load 240. More specifically, the current sense signal 218 may indicate the existence of an open circuit state at port 242, a short circuit state at port 242, or that the load 240 is drawing normal current.

In one example implementation, if there are no attached loads, e.g., all trailer connector outputs have detected an open circuit, the processor 204 may turn off all power control circuits 212. The removal of power from the trailer tow connector when a trailer plug is not inserted (no connections) will prevent corrosion and dendrite growth that typically occur when connectors with closely spaced terminals and an electrical potential are exposed to temperature variations, humidity and salt spray. The corrosion of the trailer tow connector pins may lead to intermittent or total failure of trailer electrical connections. The use and protection of a hitch lighting device is also provided for since the open detection limit (current value) would be less than the current drawn by any hitch lighting device. The described protection methods are applicable to all attached loads, whether being in the form of a trailer or a hitch lighting device.

In one example implementation, a counter circuit 248 may be used to validate an open circuit condition. This circuit 248 is optionally included, or optionally considered. Signal 218 may be alternatively fed directly to processor 204. Multiple samples of current are taken. The counter circuit 248 may be incremented by the signal 218 for each successive detected open circuit condition during the sampling period. When the count exceeds a maximum threshold, the counter circuit 248 may provide a valid open circuit state signal 250 to the processor 204. The counter circuit 248 will be reset in the absence of the detection of a successive open circuit condition (for example, within the sampling period). Responsive to the valid open circuit state signal 250 from the counter circuit 248, the processor may detect and report a valid open circuit state condition.

The circuit 200 includes a voltage sense circuit 220 configured to measure the voltage applied by the power control circuit 212 across the load 240. The voltage sense circuit 220 may be incorporated into the switched power control circuit 212. Alternatively, the voltage sense circuit 220 may be a separate, stand-alone circuit configured to measure the voltage applied across the load 240. The voltage sense circuit 220 measures the voltage across the load 240 and provides a voltage sense signal 222 in response to the measured voltage. If the measured voltage is greater than a predetermined voltage value, the voltage sense signal 222 may indicate an over voltage condition. Also, if the measured voltage is less than a predetermined voltage value, the voltage sense signal 222 may indicate a low battery voltage at the battery 202. Responsive to a low battery voltage condition at the battery 202, the processor 204 may initiate load shedding by removing or reducing power to the load 240 to preserve the battery 202's charge. Responsive to an over voltage condition, the processor 204 may decrease the voltage, current or power applied across the load 240 to prevent damage to the load by adjusting the duty cycle of the power control signal 206 and thus controlling operation of the circuit 212.

In one example implementation, the voltage sense circuit 220 includes a reference voltage generator 232 that generates a reference voltage signal. The voltage sense circuit 220 also includes a voltage comparator circuit 236 that compares the measured voltage across the load 240 to the reference voltage, and responsive to the comparison generates the voltage sense signal 222. In an alternative embodiment the voltage sense circuit may include a voltage comparator circuit that compares the measured voltage applied to the power control circuit 212 to the reference voltage, and responsive to the comparison generates the voltage sense signal 222.

In one example implementation, a counter circuit 252 may be used to validate an over voltage condition, an open condition or a low battery voltage condition. This circuit 252 is optionally included, or optionally considered. Signal 222 may be alternatively fed directly to processor 204. Multiple samples of voltage are taken by circuit 220 with corresponding multiple signals 222 being generated. The counter circuit 252 may be incremented by the signal 222 for each successive detected over voltage condition during the sampling period. When the count exceeds a maximum threshold, the counter circuit 252 may provide a valid over voltage state signal 256 to the processor 204. The counter circuit 252 will be reset in the absence of the detection of a successive over voltage condition (for example, within the sampling period). Responsive to the valid over voltage signal, the processor 204 may detect and report an over voltage condition. A separate counter circuit (not shown in FIG. 2 but similar in configuration and connection to circuit 220) may be used to validate a low battery voltage condition or an open condition.

In one example implementation, the circuit 200 includes a network interface circuit 244 for facilitating communication between the processor 204 and external devices (not shown in FIG. 2). For example, the network interface circuit 244 may facilitate communication between a vehicle (not shown in FIG. 2) and a trailer tow connector incorporating the circuit 200. This interface allows the processor 204 to output communications, such as detections of open load, short circuit or over voltage conditions at the ports 242 and loads 240, to other devices and systems. The interface further allows the processor 204 to receive information, such as programming, command and control information, from other devices and systems.

Figure 3:
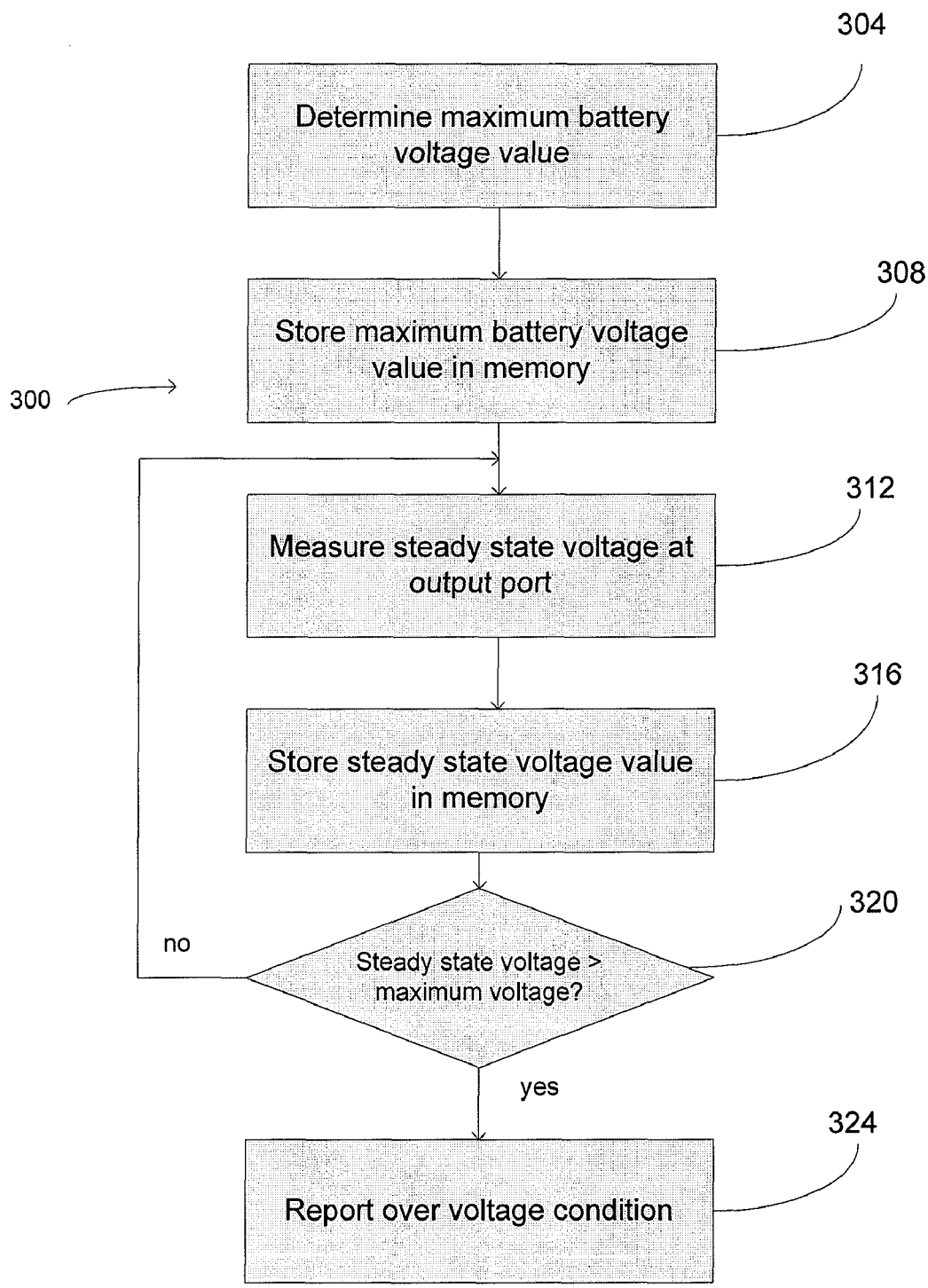
FIG. 3 is a flow diagram of an exemplary method for preserving a battery's charge and protecting electrical loads powered by the battery.

FIG. 3 is a flow diagram 300 of an exemplary method for preserving the charge on battery 202 and protecting electrical devices or loads powered by the battery 202. The method of FIG. 3 may be performed by the circuit 200 shown in FIG. 2. The electrical devices may each receive power from an output port of a respective power control circuit such as the power control circuit 212 shown in FIG. 2.

As discussed before, the circuit 200 may be incorporated in a trailer tow connector for intelligently preserving the battery 202's charge and for load shedding. It will be apparent to those skilled in the art, that the method illustrated in the flow diagram 300 can be utilized in aircraft power systems, telecommunications, wireless, networking and other applications.

In step 304, a maximum battery voltage value for the output port 242 is determined. The maximum battery voltage at the output port 242 depends on the rating and other design characteristics of the battery 202 as well as the maximum voltage rating of the load attached to the output port 242. This value could be programmed into the circuit through interface 244, or determined by the circuit 200 itself. In step 308, the maximum battery voltage value is stored in a memory such as the memory 208. In step 312, the steady state voltage at the output port 242 is measured by the voltage sense circuit 220. In step 316, the measured steady state voltage is stored in the memory 208.

In step 320, the measured steady state voltage is compared to the maximum battery voltage. In one implementation, the processor 204 compares the measured steady state voltage to the maximum battery voltage. If the measured steady state battery voltage is greater than the maximum battery voltage, an over voltage state or condition is reported in step 324. Otherwise, the flow returns to step 312.

In one implementation, the processor 204 reports the over voltage state via the network interface 244. Responsive to the over voltage state, the processor 204 sends the power control signal 206 to adjust the voltage at the output port 242. In one implementation, the power control signal 206 is a pulse width modulated signal that reduces the duty cycle of the power control circuit 212 to reduce the voltage at the output port 242. The voltage at the output port 242 may be adjusted based on the type of load coupled to the output port 242. In one implementation, the load-type is determined (e.g., incandescent bulb, gas discharge bulb, LED, battery) and based on the load-type, the power control signal 206 is generated to adjust the output voltage, current or power to an appropriate level. The output voltage may be varied within a wide range of values, from a zero voltage to a maximum voltage. The current or power measured in the load can also be varied within a selected range of values. The power calculation can be based on the power delivered to the load or the power dissipated across the load. The foregoing analysis can be made by the processor 204 with respect to each of the output ports 242 coupled to a respective load 240. For example, to extend the operational life of trailer incandescent lighting (bulbs), a closed loop voltage PWM control implemented by the processor 204 and the power control circuit 212, may be used to regulate the load voltage 242 to maintain a constant 11.9V measurement under all conditions.

In one implementation, the duty cycle of the power control circuit 212 is varied depending on the configuration of the circuit 212. If, for example, the power control circuit 212 is configured as an open loop system, the duty cycle is adjusted to a pre-selected value (e.g., 0.7 or 0.5). In contrast, if the power control circuit 212 is configured as a closed loop system, the duty cycle is varied until the voltage at the output port is brought to a desired voltage level.

Figure 4:
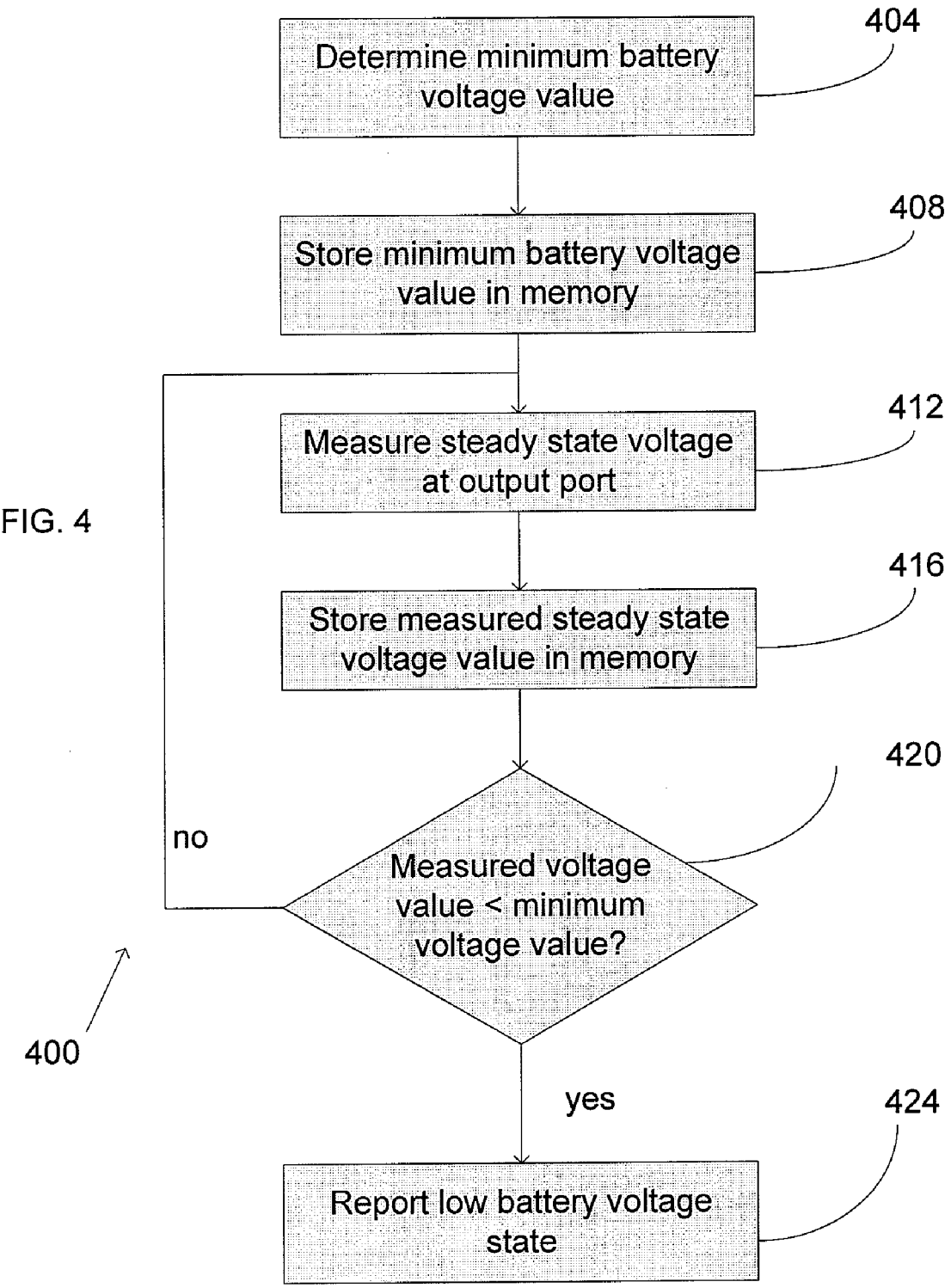
FIG. 4 is a flow diagram of another exemplary method for preserving the battery's charge.

As discussed before, in order to preserve the charge on battery 202 it is necessary to monitor the voltage at the output port 242. A low voltage condition at the output port 242 may indicate that the battery's electrical charge is low, thus requiring a load shedding to preserve the battery's charge. FIG. 4 is a flow diagram 400 of an exemplary method for preserving the battery 202's charge. In step 404, a minimum battery voltage is determined. The minimum battery voltage value is a threshold below which the battery is considered to be at risk of being depleted and where it would not be possible to start the vehicle. The minimum battery voltage is based on the characteristics of the battery as well as the load connected to the output port 242.

In step 408, the minimum battery voltage value is stored in the memory 208. This value could be programmed into the circuit through interface 244, or determined by the circuit 200 itself. In step 412, the steady state voltage at the output port 242 is measured by the voltage sense circuit 220. In step 416, the measured steady state voltage is stored in the memory. In one implementation, the measured steady state voltage is stored in the memory 208 by the processor 204.

In step 420, the measured steady state voltage is compared to the minimum battery voltage. In one implementation, the processor 204 compares the measured steady state voltage to the minimum battery voltage. In step 424, if the measured steady state voltage is less than the minimum battery voltage, a low battery voltage state is reported by the processor 204. Otherwise, the flow returns to step 412. In response to the low battery voltage state, the processor 204 sends the power control signal 206 to vary the voltage at the output port 242. For example, the duty cycle of the power control circuit 212 may be reduced to decrease the voltage at the output port 242 to preserve the battery charge. If necessary, the voltage at the output port 242 may be reduced to zero to remove power from the attached load 240.

In one example implementation, if a plurality of loads 240 are powered by the battery 202, selective load shedding may be initiated to preserve the battery's charge. For example, if three loads are each coupled to a respective power control circuit, the duty cycle of each of the power control circuits may be varied to reduce the respective voltage, current or power across each load. In one implementation, if the load is considered a non-critical load, the duty cycle may be varied or the power control circuit 212 may be disabled or turned off to remove electrical power from the load. If the load is considered a critical load, the duty cycle may be varied to reduce power at the output port in order to decrease the rate of depletion of the battery's charge while providing an acceptable reduced voltage, current or power level to the critical load. A critical load may, for example, be a load that impacts the safety or operation of either the tow vehicle or the attached load. Examples of critical loads include running/marker and stop/brake lamps. An example of a non-critical load includes a switched battery output that powers trailer auxiliary loads. Data regarding critical and non-critical loads may be stored in the memory 208 and accessed by the processor 204 for analysis.

A variety of load shed designs or strategies may can be realized by implementing logic on the processor 204 and utilizing measured data such as the load voltage, the load current as well as vehicle operational information that may be acquired through the network interface 244. In one implementation, a vehicle battery's charge may be preserved by using the above-described method if the vehicle engine's RPM falls below a low threshold value and/or the vehicle speed is at or near zero MPH. Information regarding the vehicle's engine RPM or speed may be provided to the processor via the communication network interface 244. If the vehicle's engine RPM and speed falls below a predetermined or calculated threshold value, indicating the vehicle may be in an idle mode, one or more loads may be disconnected from the battery. Consider for example that a vehicle's battery powers one or more loads installed in a trailer attached to the vehicle. If the vehicle is idling, i.e., in an idle mode, it may be unnecessary to power all the loads in the trailer. Accordingly, the vehicle engine's RPM and/or vehicle speed may be monitored and measured, and responsive to the measurements, load shedding may be initiated using the circuit 200 to preserve the battery's charge. In addition to preserving the vehicle's battery charge, idle mode load shedding can improve idle quality, fuel economy and vehicle acceleration/performance. Once vehicle speed, battery voltage or engine RPM have exceeded predetermined or calculated respective thresholds as stored in memory 208, the circuit 200 may re-enable, turn on, or return to normal PWM control all power control circuits 212 that had been previously modified in the load shed action. In one example implementation, load shedding can be applied selectively to critical loads based on operating conditions. For example if headlamps are on and it is daytime (as sensed by an ambient light signal typically used with an auto-headlamps feature and provide through interface 244), then it would be permissible and safe to perform at least a minimum load shed on the trailer marker/running lamps. Additional vehicle status information (provided through interface 244) such as fog lamps status or wiper status can be used as additional factors considered by the logic to control the load shed function. In one implementation, if it is daytime (ambient light sensor=daytime) and it is foggy outside (fog lamps=on), then load shedding of trailer marker/running lights will not be initiated (because these lights are considered safety important).

In one implementation, if the vehicle is in a sleep mode (e.g., vehicle engine turned off, vehicle door or headlamp switches not activated as known from the information communicated on the interface 244) or the network interface 244 is in a sleep state, electrical power may be removed from one or more loads to preserve the battery's charge. For example, in response to a determination that the vehicle is in a sleep mode, load shedding may be initiated to disconnect power from one or more attached trailer loads to preserve the battery's charge. The vehicle may provide a signal to the processor 204 via the network interface 244 indicating that the vehicle is in a sleep mode.

In one implementation, the circuit 200 can be utilized to preserve the battery's charge in response to a thermal overload (i.e., over heating) condition as sensed internally by the circuit 200. Thus, the circuit 200 may be configured to measure the temperature of the loads 240 and provide a temperature sense signal (e.g., signal 210 or communicated through interface 244 or some other received signal) responsive to the measured load temperature. The temperature sense signal is representative of the load temperature. A thermal overload condition may indicate that the load 240 is drawing excessive current, thus necessitating load shedding to prevent a permanent malfunction or degradation resulting from continued thermal overstress or fast thermal transients. For example, if the temperature sense signal indicates that the load temperature exceeds a maximum temperature threshold, load shedding may be initiated using the above-described method. The thermal overload condition at load 240 may be communicated to processor 204 via the signal 210 from the power control circuit 212. Alternatively, one or more temperature sensing devices may be installed on a trailer tow connector PCB board whose signals may be connected to the processor 204.

In one implementation, the circuit 200 may be utilized to recharge a trailer battery 241 that is electrically coupled to a vehicle battery via the circuit 200. The trailer battery is generally installed in certain trailer types (RV or commercial) that can be towed by a vehicle. The trailer battery may power one or more loads installed in the trailer such as interior trailer lights, a trailer DC-AC inverter, or furnace/heater/refrigerator natural gas igniter circuits.

Figure 5A:
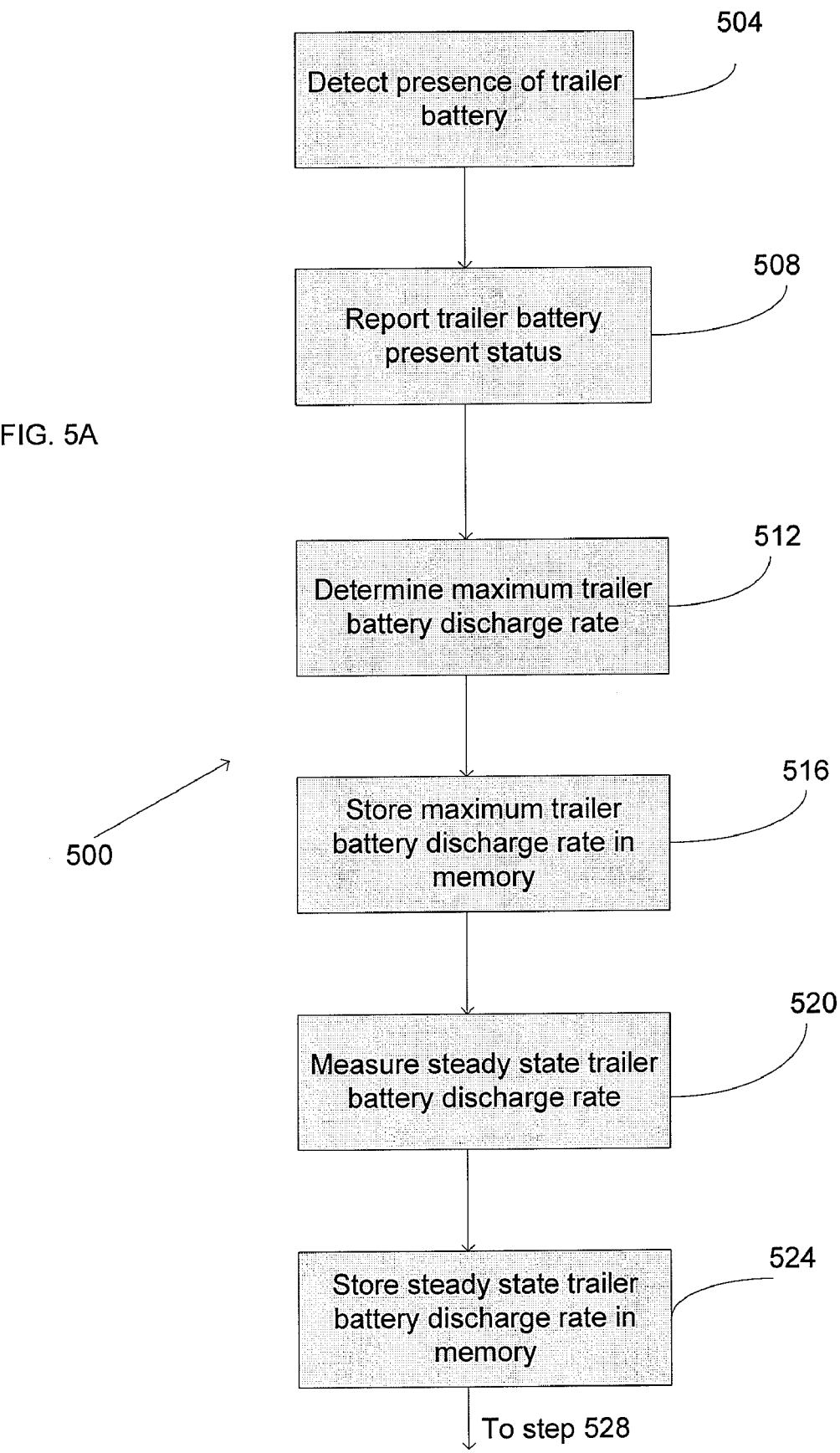
FIGS. 5A-5B illustrate a flow diagram of an exemplary method for recharging a battery.
Figure 5B:
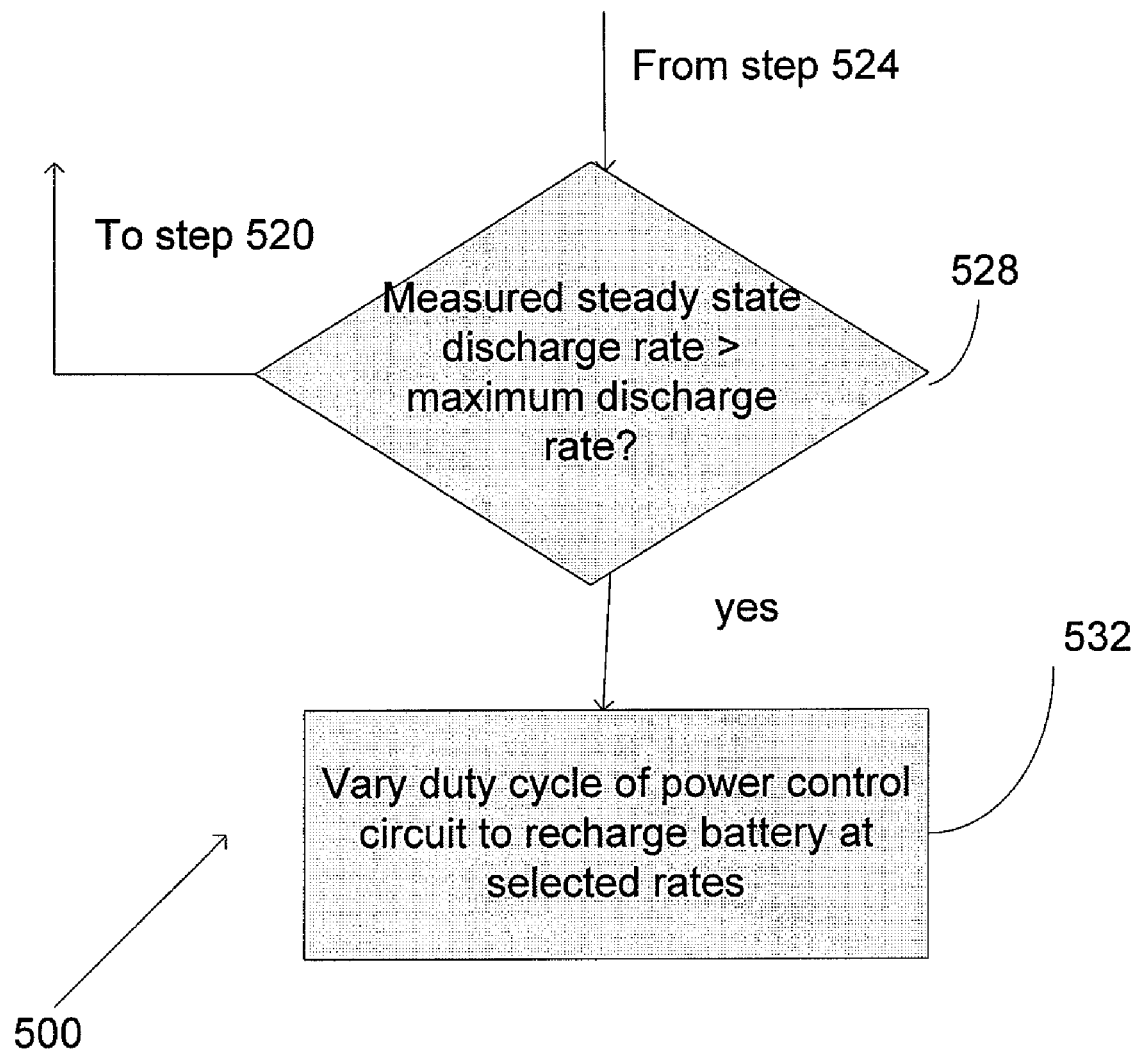

FIGS. 5A-5B illustrate a flow diagram 500 of an exemplary method for recharging a trailer battery (e.g., battery 241) using the circuit 200. In step 504, a determination is made if a trailer battery 241 is electrically coupled to the vehicle battery (this can be accomplished through current and/or voltage sensing). In step 508, a trailer battery present status is reported if a trailer battery 241 is coupled to the vehicle battery. In step 512, a maximum trailer battery recharge rate is determined. The maximum trailer battery recharge rate is the maximum permissible vehicle charging rate of the trailer battery and is based on the characteristic of the detected trailer battery. This value can be calculated, or loaded through the interface 244. In step 516, the maximum trailer battery recharge rate value is stored in the memory 208. In step 520, a steady state trailer battery discharge rate is measured. The steady state trailer battery discharge rate depends on one or more loads attached to the trailer battery as well as the state of charge or condition of the trailer battery. In step 524, the measured steady state trailer battery discharge rate is stored in the memory 208. In step 528, the measured discharge rate is compared to the maximum recharge rate. If the measured discharge rate exceeds the maximum recharge rate, in step 532 the duty cycle of the power control circuit 212 is varied to recharge the trailer battery. Otherwise, the flow returns to step 520.

In one implementation, the processor 204 sends a first power control signal 206 to recharge the trailer battery at a high rate during a first time period and then at a low rate during a second time period. The trailer battery may alternately be recharged at a high rate and a low rate until the trailer battery is completely recharged. By alternately recharging the trailer battery at a high and a low rate, the operational life of the trailer battery is prolonged. The charging time at both the high and low recharge rates are calculated based on the measured trailer battery discharge rate.

The foregoing methods allows intelligent load shedding by preserving a vehicle's battery charge, which allows the driver to return the vehicle home, to a service station or other safe location. These methods provide for increased electrical efficiency, which can lead to improved fuel economy, improved idle quality and improved vehicle acceleration and performance.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. A method for preserving a battery's charge and protecting electrical devices each receiving power from an output port of a respective power control circuit coupled to the battery in a vehicle, comprising:
   measuring a steady state battery voltage at the output port;
   comparing, by a processor, the measured steady state battery voltage value to high and low battery voltage thresholds, wherein said high battery voltage threshold is based on a design characteristic of said battery and an upper voltage threshold limit of an electrical device receiving power from an output port of said power control circuit, and said low battery voltage threshold is based on a design characteristic of said battery and a lower voltage threshold limit of said electrical device;
   if the measured steady state battery voltage value is greater than the high battery voltage threshold, reporting an over voltage state;
   if the measured steady state battery voltage value is less than the low battery voltage threshold, reporting a low battery voltage state;
   in response to the over voltage state, sending, by the processor, a first power control signal to the power control circuit to vary the voltage or current at the output port; and
   in response to the low battery voltage state, sending, by the processor, a second power control signal to the power control circuit to vary or remove the voltage or the current at the output port.

2. The method according to claim 1, further comprising:
   determining if the electrical device is a non-critical load; and
   responsive to the determination that the electrical device is a non-critical load, varying the duty cycle of the power control circuit by the second power control signal to remove electrical power from the output port.

3. The method according to claim 1, further comprising:
   determining if the electrical device is a critical load; and
   responsive to the determination that the electrical device is a critical load, varying the duty cycle of the power control circuit by the second power control signal to reduce the voltage at the output port.

4. The method according to claim 1, further comprising:
   determining if a trailer is connected to the vehicle; and
   removing electrical power from one or more output ports if a trailer is not connected to the vehicle.

5. The method according to claim 1, further comprising:
   determining if the vehicle is in a sleep mode, wherein during the sleep mode the vehicle battery provides electrical power to an attached trailer while the vehicle's engine and electrical loads are turned off;
   responsive to the determination that the vehicle is in a sleep mode, measuring the voltage at the output port;
   comparing the measured voltage to the low battery voltage threshold; and
   reducing the voltage at the output port by varying the duty cycle of the power control circuit by the second power control signal if the measured voltage is less than the low battery voltage threshold.

6. The method according to claim 1, further comprising:
   determining the type of the electrical device; and
   responsive to the type of the electrical device, varying the duty cycle of the power control circuit by the second power control signal.

7. The method according to claim 1, wherein the processor and the power control circuit are implemented in a trailer tow connector configured to provide electrical power to a trailer attached to the vehicle.

8. A method for monitoring a battery's charge and protecting electrical devices each receiving power from an output port of a respective power control circuit coupled to the battery, comprising:
   measuring a steady state battery voltage at the output port;
   comparing, by a processor, the measured steady battery voltage value to a high battery voltage threshold, wherein said high battery voltage threshold is based on a design characteristic of said battery and an upper voltage threshold limit of an electrical device receiving power from an output port of said power control circuit;
   if the measured steady state battery voltage value is greater than the high battery voltage threshold, reporting an over voltage state; and
   in response to the over voltage state, sending, by the processor, a power control signal to the power control circuit to vary the voltage or current at the output port.

9. The method according to claim 8, further comprising:
   determining the type of electrical device connected to the output port; and
   responsive to the type of electrical device, varying the duty cycle of the power control circuit by the power control signal to reduce the voltage at the output port.

10. The method according to claim 8, further comprising:
    determining the type of electrical device connected to the output port; and
    responsive to the type of electrical device, varying the duty cycle of the power control circuit by the power control signal to reduce the current flowing in the electrical device.

11. The method according to claim 8, further comprising:
    determining the type of electrical device connected to the output port; and
    responsive to the type of electrical device, varying the duty cycle of the power control circuit by the power control signal to reduce the power flowing in the electrical device.

12. The method according to claim 8, further comprising:
    determining if the power control circuit is configured as an open loop system; and
    varying the duty cycle of the power control circuit by the power control signal to a pre-selected first duty cycle if the power control circuit is configured as an open loop system.

13. The method according to claim 8, further comprising:
    determining if the power control circuit is configured as a closed loop system; and
    varying the duty cycle of the power control circuit by the power control signal until the voltage at the output port is equal to a pre-selected first voltage.

14. The method according to claim 8, further comprising:
    determining if the power control circuit is configured as a closed loop system; and
    varying the duty cycle of the power control circuit by the power control signal until the current flowing in the electrical device is equal to a pre-selected first current.

15. A method for preserving a vehicle's battery charge, the battery providing electrical power to electrical devices each receiving power from an output port of a respective power control circuit coupled to the battery, comprising:
    measuring a steady state battery voltage at the output port;
    comparing, by a processor, the measured steady battery voltage value to a low battery voltage threshold, wherein said low battery voltage threshold is based on a design characteristic of said battery and a lower voltage threshold limit of an electrical device receiving power from an output port of said power control circuit;
    if the measured steady state battery voltage value is less than the low battery voltage threshold, reporting a low battery voltage state; and in response to the low battery voltage state, sending, by the processor, a power control signal to the power control circuit to vary the voltage or current at the output port.

16. The method according to claim 15, further comprising:
determining if the electrical device is a non-critical load; and
responsive to the determination that the electrical device is a non-critical load, varying the duty cycle of the power control circuit by the power control signal to remove electrical power from the output port.

17. The method according to claim 15, further comprising:
determining if the electrical device is a critical load; and
responsive to the determination that the electrical device is a critical load, varying the duty cycle of the power control circuit by the power control signal to reduce the voltage or current at the output port.

18. The method according to claim 15, further comprising:
determining if a trailer is connected to the vehicle; and
removing electrical power from the output ports if a trailer is not connected to the vehicle.

19. The method according to claim 15, further comprising:
determining if the vehicle is in a sleep mode, wherein during the sleep mode the vehicle battery provides electrical power to an attached trailer while the vehicle's engine and vehicle loads are turned off;
responsive to the determination that the vehicle is in a sleep mode, measuring the voltage at the output port;
comparing the measured voltage to the low battery voltage threshold; and
reducing the voltage at the output port by varying the duty cycle of the power control circuit by the power control signal if the measured voltage is less than the low battery voltage threshold.

20. The method according to claim 1, further comprising:
determining if an electrical device is connected to one or more output ports; and
removing electrical power from the one or more output ports if an electrical device is not connected to the respective one or more output ports.

21. The method according to claim 1, further comprising:
determining a load type of the electrical device; and
varying the duty cycle of the power control circuit to adjust voltage, current, or power at the output port based on the load type of the electrical device.

22. The method according to claim 1, further comprising:
determining operating conditions of the vehicle; and
varying the duty cycle of the switched power control circuit to adjust the voltage, current, or power at the output port based on the operating conditions of the vehicle.

23. A method for preserving a battery's charge and protecting electrical devices each receiving power from an output port of a trailer tow connector coupled to the battery in a vehicle, comprising:
measuring a steady state battery voltage at the output port;
comparing, by a processor, the measured steady state battery voltage value to high and low battery voltage thresholds, wherein said high battery voltage threshold is based on a design characteristic of said battery and an upper voltage threshold limit of an electrical device receiving power from an output port of said power control circuit, and said low battery voltage threshold is based on a design characteristic of said battery and a lower voltage threshold limit of said electrical device;
if the measured steady state battery voltage value is greater than the high battery voltage threshold, reporting an over voltage state;
if the measured steady state battery voltage value is less than the low battery voltage threshold, reporting a low battery voltage state;
in response to the over voltage state, sending, by the processor, a first power control signal to vary the voltage or current at the output port; and
in response to the low battery voltage state, sending, by the processor, a second power control signal to vary or remove the voltage or the current at the output port.

24. The method according to claim 23, further comprising:
determining if an electrical device is connected to one or more output ports; and
removing electrical power from the one or more output ports if an electrical device is not connected to the respective one or more output ports.

25. The method according to claim 23, further comprising:
determining a load type of the electrical device; and
adjusting the voltage, current, or power at the output port based on the load type of the electrical device.

26. The method according to claim 1, wherein a design characteristic of the battery is the voltage rating of the battery.

27. The method according to claim 1, wherein the low battery voltage threshold is a threshold below which the battery is considered to be at risk of being depleted.

28. The method according to claim 8, wherein a design characteristic of the battery is the voltage rating of the battery.

29. The method according to claim 15, wherein a design characteristic of the battery is the voltage rating of the battery.

30. The method according to claim 15, wherein the low battery voltage threshold is a threshold below which the battery is considered to be at risk of being depleted.

31. The method according to claim 23, wherein a design characteristic of the battery is the voltage rating of the battery.

32. The method according to claim 23, wherein the low battery voltage threshold is a threshold below which the battery is considered to be at risk of being depleted.

33. The method according to claim 1, wherein at least one of said high battery voltage threshold or said low battery voltage threshold is determined by said power control circuit.

34. The method according to claim 1, wherein at least one of said high battery voltage threshold or said low battery voltage threshold is defined by a user.

35. The method according to claim 8, wherein said high battery voltage threshold is determined by said power control circuit.

36. The method according to claim 8, wherein said high battery voltage threshold is defined by a user.

37. The method according to claim 15, wherein said low battery voltage threshold is determined by said power control circuit.

38. The method according to claim 15, wherein said low battery voltage threshold is defined by a user.

39. The method according to claim 23, wherein at least one of said high battery voltage threshold or said low battery voltage threshold is determined by said power control circuit.

40. The method according to claim 23, wherein at least one of said high battery voltage threshold or said low battery voltage threshold is defined by a user.

* * * * *